(12) United States Patent
Ohki et al.

(10) Patent No.: US 7,246,485 B2
(45) Date of Patent: Jul. 24, 2007

(54) EXHAUST GAS PURIFYING DEVICE AND METHOD FOR INTERNAL COMBUSTION ENGINE

(75) Inventors: Hisashi Ohki, Numazu (JP); Masaaki Kobayashi, Susono (JP); Naofumi Magarida, Susono (JP); Daisuke Shibata, Susono (JP); Shinobu Ishiyama, Numazu (JP); Akihiko Negami, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 14 days.

(21) Appl. No.: 10/491,721

(22) PCT Filed: Oct. 14, 2002

(86) PCT No.: PCT/IB02/04200

§ 371 (c)(1),
(2), (4) Date: Apr. 12, 2004

(87) PCT Pub. No.: WO03/033892

PCT Pub. Date: Apr. 24, 2003

(65) Prior Publication Data

US 2004/0261401 A1 Dec. 30, 2004

(30) Foreign Application Priority Data

Oct. 15, 2001 (JP) ............................. 2001-317222

(51) Int. Cl.
*F01N 3/00* (2006.01)
(52) U.S. Cl. .............................. 60/285; 60/286; 60/295
(58) Field of Classification Search .................. 60/295, 60/297, 301, 285, 286
See application file for complete search history.

(56) References Cited

U.S. PATENT DOCUMENTS

| 4,404,795 | A | * | 9/1983 | Oishi et al. .................... 60/274 |
| 4,835,964 | A | * | 6/1989 | Kume et al. ................... 60/285 |
| 6,216,676 | B1 | * | 4/2001 | Gotoh et al. ........... 123/568.21 |
| 6,598,387 | B2 | * | 7/2003 | Carberry et al. .............. 60/297 |
| 2002/0078681 | A1 | * | 6/2002 | Carberry et al. .............. 60/280 |
| 2002/0152744 | A1 | * | 10/2002 | Kawatani et al. ............. 60/286 |

FOREIGN PATENT DOCUMENTS

DE      198 50 757 A 1      2/2000

(Continued)

Primary Examiner—Thomas Denion
Assistant Examiner—Loren Edwards
(74) Attorney, Agent, or Firm—Oliff & Berridge, PLC

(57) ABSTRACT

Removal of fine particles by oxidation or/and sulfur poisoning recovery control may be required when an internal combustion engine has been in an extremely low load state for a predetermined period or more. In this case, the engine speed of the internal combustion engine (1) is adjusted to a range where the temperature of a filter (20) can be raised by heat-up control. The heat-up control is then executed by a filter temperature control means to raise the temperature of the filter (20) to a predetermined value. When the filter (20) reaches the predetermined temperature by means of low-temperature combustion, post-injection, VIGOM-injection, addition of 10 fuel to an exhaust system and the like, removal of fine particles by oxidation or/and sulfur poisoning recovery control for eliminating sulfur poisoning of a NOx absorbent are conducted. Removal of PMs captured by the filter and sulfur poisoning recovery control of the NOx absorbent can thus be conducted even if the internal combustion engine is left in an extremely low load operational state.

2 Claims, 6 Drawing Sheets

| | FOREIGN PATENT DOCUMENTS | | |
|---|---|---|---|
| EP | 0 272 619 A1 | 6/1988 | |
| EP | 0 321 451 A2 | 6/1989 | |
| EP | 0 758 713 A1 | 2/1997 | |
| EP | 758713 A1 * | 2/1997 | |
| JP | 63150441 | 6/1988 | |
| JP | 63297722 | 12/1988 | |
| JP | A-03233124 | 10/1991 | |
| JP | A 6-159037 | 6/1994 | |
| JP | B2 2845056 | 10/1998 | |
| JP | A-2000352303 | 12/2000 | |
| JP | A-2001271637 | 10/2001 | |

* cited by examiner

EXHAUST GAS PURIFYING DEVICE AND METHOD FOR INTERNAL COMBUSTION ENGINE

BACKGROUND OF THE INVENTION

1. Field of the Invention

The invention relates to an exhaust gas purifying device and method for an internal combustion engine, and more particularly, to an exhaust gas purifying device and an exhaust gas purifying method which are capable of conducting recovery from sulfur poisoning and the like even if extremely low-load operation is continued.

2. Description of Related Art

In an internal combustion engine installed in an automobile or the like, especially in a diesel engine or a lean-burn gasoline engine in which a mixture containing an excessive amount of oxygen (a mixture exhibiting a so-called lean air-fuel ratio) can burn, the advent of an technology for purifying nitrogen oxides (NOx) contained in exhaust gas in the internal combustion engine has been expected.

A technology of disposing an NOx absorbent in an exhaust system of an internal combustion engine has been proposed to meet such a demand. An occlusion/reduction-type NOx catalyst has been known as one type of the NOx absorbent. The occlusion/reduction-type NOx catalyst absorbs nitrogen oxides (NOx) contained in exhaust gas when the exhaust gas flowing into the catalyst exhibits a high oxygen concentration, and discharges the absorbed nitrogen oxides (NOx) and reduces them to nitrogen ($N_2$) when the exhaust gas flowing into the catalyst exhibits a decreased oxygen concentration in the presence of a reducing agent.

In the case where the occlusion/reduction-type NOx catalyst is disposed in the exhaust system of the internal combustion engine, nitrogen oxides (NOx) contained in exhaust gas are absorbed by the occlusion/reduction-type NOx catalyst when the exhaust gas exhibits a high air-fuel ratio during lean-burn operation of the internal combustion engine, and the nitrogen oxides (NOx) absorbed by the occlusion/reduction-type NOx catalyst are discharged and reduced to nitrogen ($N_2$) when the exhaust gas flowing into the occlusion/reduction-type NOx catalyst exhibits a reduced air-fuel ratio.

It is to be noted herein that sulfur oxides (SOx), which are produced through combustion of sulfur contained in fuel, are also absorbed by the occlusion/reduction-type NOx catalyst according to the same mechanism as in the case of NOx. Sulfur oxides (SOx) are not discharged when nitrogen oxides (NOx) are usually discharged and reduced. Thus, if a predetermined amount or more of sulfur oxides (SOx) is accumulated, the NOx catalyst becomes saturated and unable to absorb NOx. This phenomenon, which is referred to as sulfur poisoning (SOx poisoning), causes a decrease in the NOx purification ratio. For this reason, a poisoning recovery process for recovering the NOx catalyst from SOx poisoning needs to be performed at a suitable timing. This poisoning recovery process is performed by allowing exhaust gas with a decreased oxygen concentration to flow through the NOx catalyst while the NOx catalyst is held at a high temperature (e.g., 600 to 650° C.).

However, exhaust gas is below the aforementioned temperature during lean-burn operation. Thus, when the engine is in a normal operational state, it is difficult to raise the bed temperature of the NOx catalyst to a temperature required for the recovery from sulfur poisoning. In such a case, it is possible to decrease the oxygen concentration of exhaust gas while raising the temperature of the aforementioned catalyst by adding fuel to an exhaust passage.

As a method for raising the temperature of the NOx catalyst, an exhaust gas purifying device for an internal combustion engine has been proposed in Japanese Patent Publication No. 2845056. The exhaust gas purifying device for the internal combustion engine disclosed in this publication determines the addition amount of a reducing agent in consideration of the amount of the reducing agent consumed through a reaction with oxygen contained in exhaust gas in an occlusion/reduction-type NOx catalyst and the amount of the reducing agent required for the reduction of nitrogen oxides (NOx) absorbed by the occlusion/reduction-type NOx catalyst. This exhaust gas purifying device thus prevents the reducing agent from being supplied excessively or insufficiently and aims at inhibiting exhaust emission properties from being deteriorated by the discharge of the reducing agent or nitrogen oxides (NOx) into the atmosphere.

On the other hand, in a diesel engine, it is important to remove particulate matters (hereinafter, referred to as "PMs" unless otherwise mentioned) such as soot as a suspended particulate matter contained in exhaust gas. A technology of providing a particulate filter (hereinafter, simply referred to as "filter") for collecting PMs in an exhaust system of the diesel engine in order to prevent the PMs from being discharged into the atmosphere is therefore well-known in the art. This filter collects the PMs contained in exhaust gas and thus prevents them from being discharged into the atmosphere. However, if the PMs collected by the filter are accumulated on the filter, the filter may be clogged with the PMs. Such clogging raises the pressure of the exhaust gas upstream of the filter, thereby possibly causing reduced output power of the internal combustion engine and damage of the filter. In such a case, it is possible to remove the PMs by igniting and burning the PMs accumulated on the filter. Such removal of the PMs accumulated on the filter is called regeneration of the filter.

In order to ignite and burn the PMs collected by the filter, the temperature of the filter must be raised to a high temperature of, e.g., 500° C. or more. However, since the exhaust gas temperature of the diesel engine is lower than this temperature, it is difficult to remove the PMs through combustion in a normal operation state.

It is possible to use an electric heater, burner or the like to heat the filter to a temperature that causes ignition and combustion of the collected PMs. However, this requires a great amount of energy to be supplied from the outside. Regarding this problem, Japanese Patent Laid-Open Publication No. 6-159037 and the like use a filter carrying a NOx catalyst and a device for supplying hydrocarbons to exhaust gas as a reducing agent. This facilitates combustion of the PMs by using the heat generated by combustion of the hydrocarbons supplied to the exhaust gas in the NOx catalyst.

The aforementioned recovery from sulfur poisoning is carried out with the oxygen concentration of exhaust gas decreased. However, if the reducing agent is added during high-load operation of the internal combustion engine, the reducing agent burns in the occlusion/reduction-type NOx catalyst. As a result, the temperature of the occlusion/reduction-type NOx catalyst rises excessively. This may cause thermal degradation of the occlusion/reduction-type NOx catalyst. Accordingly, it is preferable that the recovery from sulfur poisoning be carried out while the internal combustion engine is in a low-load range.

However, in the case where the internal combustion engine is in an extremely low-load operation state for a long time, for example, in the case where a vehicle having the internal combustion engine is parked in an idle state for a long time or runs in heavy traffic in a town, the internal combustion engine discharges a small amount of exhaust gas and thus the absolute amount of heat generated by the exhaust gas is not enough to raise the overall temperature of the filter (e.g., filter with a 2-liter capacity) carrying the NOx catalyst.

Even if control for regeneration of the PMs accumulated on the filter or control for regeneration of the NOx catalyst from sulfur poisoning (also referred to as control for recovery from sulfur poisoning) need be carried out in such a state, it is impossible to raise the temperature of the NOx catalyst to a temperature range required for such controls. It is therefore impossible to carry out these controls. As a result, the PMs and NOx are not removed, thereby possibly causing insufficient purification of the exhaust gas.

SUMMARY OF THE INVENTION

The invention is made to solve the above problems, and it is an object of the invention to provide a technology capable of conducting removal of PMs captured by a filter and sulfur poisoning recovery control of a NOx catalyst even if an internal combustion engine is left in an extremely low-load operation state.

In order to achieve the above object, an exhaust gas purifying device for an internal combustion engine according to the invention adopts the following means. More specifically, the exhaust gas purifying device includes a filter, a filter temperature control means, and a sulfur poisoning recovery control means. The filter carries a NOx absorbent thereon, and is capable of temporarily capturing fine particles contained in exhaust gas of the internal combustion engine and of removing the fine particles by oxidation in a prescribed temperature range. The NOx absorbent functions to absorb NOx contained in the exhaust gas when the exhaust gas flowing into the NOx absorbent exhibits a lean air-fuel ratio and to discharge the absorbed NOx when the exhaust gas flowing into the NOx absorbent exhibits a theoretical air-fuel ratio or a rich air-fuel ratio. The filter temperature control means executes heat-up control of the filter. The sulfur poisoning recovery control means executes control for eliminating sulfur poisoning of the NOx absorbent. The exhaust gas purifying device is characterized in that when it is determined that the fine-particle removal control by oxidation or/and the sulfur poisoning recovery control is to be executed, and the internal combustion engine has been in an extremely low load state for a predetermined period or more, an engine speed of the internal combustion engine is adjusted to a range where a temperature of the filter can be raised by heat-up control, and the heat-up control is then executed by the filter temperature control means to raise the temperature of the filter to a predetermined value, thereby executing the fine-particle removal control by oxidation or/and the sulfur poisoning recovery control for eliminating sulfur poisoning of the NOx absorbent.

According to a further aspect of the invention, an exhaust gas purifying method of an exhaust gas purifying device for an internal combustion engine is provided. The exhaust gas purifying device includes a filter, a filter temperature control means, and a sulfur poisoning recovery control means. The filter carries a NOx absorbent thereon, and is capable of temporarily capturing fine particles contained in exhaust gas of the internal combustion engine and of removing the fine particles by oxidation in a prescribed temperature range. The NOx absorbent functions to absorb NOx contained in the exhaust gas when the exhaust gas flowing into the NOx absorbent exhibits a lean air-fuel ratio and to discharge the absorbed NOx when the exhaust gas flowing into the NOx absorbent exhibits a theoretical air-fuel ratio or a rich air-fuel ratio. The filter temperature control means executes heat-up control of the filter. The sulfur poisoning recovery control means executes control for eliminating sulfur poisoning of the NOx absorbent. The exhaust gas purifying method includes the steps of: when it is determined that the fine-particle removal control by oxidation or/and the sulfur poisoning recovery control is to be executed, and the internal combustion engine has been in an extremely low load state for a predetermined period or more, adjusting an engine speed of the internal combustion engine to a range where a temperature of the filter can be raised by heat-up control; executing the heat-up control by the filter temperature control means to raise the temperature of the filter to a predetermined value; and executing the fine-particle removal control by oxidation or/and the sulfur poisoning recovery control for eliminating sulfur poisoning of the NOx absorbent.

The above exhaust gas purifying device for the internal combustion engine and the above exhaust gas purifying method are characterized in that, if the internal combustion engine has been in an extremely low load state for a predetermined period or more and removal of fine particles by oxidation or recovery from sulfur poisoning is required for the filter, the engine speed of the internal combustion engine is adjusted to execute these processes, and the heat-up control is executed to raise the temperature of the filter to a predetermined value at which the aforementioned processes can be conducted. Thereafter, the removal of fine particles by oxidation and the recovery from sulfur poisoning can be executed.

The air-fuel ratio of the exhaust gas does not refers to a weight ratio of air to fuel contained in mixture introduced into the internal combustion engine, but a weight ratio of air to fuel contained in gas discharged to an exhaust passage as a result of combustion of the internal combustion engine.

For example, "when the internal combustion state is in the extremely low load state" refers to the case where the internal combustion engine is in an idle state.

"Adjusting the engine speed of the internal combustion engine to the range where the temperature of the filter can be raised" means that, if the internal combustion engine in an idle state or in a state close to the idle state has an engine speed of less than 1,000 rpm, the engine speed is raised to, e.g., 1,200 rpm or more. This value of the engine speed varies depending on the state of the internal combustion engine and other operational states.

In this way, the engine speed of the internal combustion engine is first raised to increase the heat generation amount, and thus shifted to the range where the temperature of the filter can be raised by the heat-up control. Thereafter, the heat-up control can be executed by any combination of low-temperature combustion, post-injection, VIGOM-injection, and addition of fuel to an exhaust system according to an operational state of the internal combustion engine. For example, the heat-up control for removing the fine particles by oxidation may be executed by combination of one or more of the low-temperature combustion, the post-injection, the VIGOM-injection, and the addition of fuel to the exhaust system, and the heat-up control for recovery from sulfur poisoning may be executed by combination of the low-temperature combustion and the addition of fuel to the exhaust system.

In the heat-up control for removing the fine particles by oxidation, it is preferable to conduct at least the low-temperature combustion when a coolant temperature of the internal combustion engine is equal to or higher than a predetermined value, and to conduct at least the post-injection when the coolant temperature of the internal combustion engine is less than the predetermined value.

The low-temperature combustion is preferably conducted in the internal combustion engine at a weak lean air-fuel ratio in a range of 15 to 19.

The removal of fine particles by oxidation and the recovery from sulfur poisoning are individually conducted as required. For example, in the recovery from sulfur poisoning, the temperature of the filter must be normally raised to a higher value (at least 600° C.) than that in the removal of fine particles by oxidation. Therefore, there may be the case where the bed temperature of the filter is raised to about 500° C. to conduct only the removal of fine particles by oxidation.

In the removal of fine particles by oxidation, a pressure gauge may be disposed upstream and downstream of the filter to measure an exhaust gas pressure in an exhaust passage at positions upstream and downstream of the filter. When the difference between the measured exhaust gas pressures reaches a predetermined value or more, it is determined that at least a predetermined amount of fine particles has been accumulated on the filter. Therefore, it can be determined that the removal of fine particles by oxidation is required.

Whether the sulfur poisoning recovery control must be conducted or not may be determined based on the following factors: the total amount of fuel supplied to the engine, the amount of fuel added to the filter, the flowing amount of NOx, which is detected by a NOx sensor provided downstream of the filter, the running distance of a vehicle having an internal combustion engine mounted thereon, or the like.

In the exhaust gas purifying device for the internal combustion engine according to the invention, an active oxygen discharging agent for absorbing oxygen when an excessive amount of oxygen is present around the active oxygen discharging agent and discharging the absorbed oxygen as active oxygen when an ambient oxygen concentration is decreased may be carried on the filter. The active oxygen is discharged from the active oxygen discharging agent when fine particles adhere to the filter, whereby the fine particles adhering to the-filter can be removed by oxidation with the discharged active oxygen.

The exhaust gas purifying device for the internal combustion engine according to the invention thus provides a series of means for conducting removal of fine particles by oxidation or/and sulfur poisoning recovery of a NOx absorbent which cannot be conducted unless the temperature of the filter is raised to a predetermined value in the case where the internal combustion is left in an extremely low load operational state. Therefore, the removal of fine particles accumulated on the filter and recovery of the sulfur-poisoned NOx catalyst can be realized even in such a situation.

BRIEF DESCRIPTION OF THE DRAWINGS

The above and other objects, features, advantages, and technical and industrial significance of this invention will be better understood by reading the following detailed description of exemplary embodiments of the invention, when considered in connection-with the accompanying drawings, in which.

DESCRIPTION OF THE EXEMPLARY EMBODIMENTS

In the following description and the accompanying drawings, the invention will be described in more detail in terms of exemplary embodiments.

Hereinafter, a specific embodiment of an exhaust gas purifying device for an internal combustion engine according to the invention will be described with reference to the drawings. The following description deals with an exemplary case where the exhaust gas purifying device for the internal combustion engine according to the invention is applied to a diesel engine for driving a vehicle.

Figure 1:
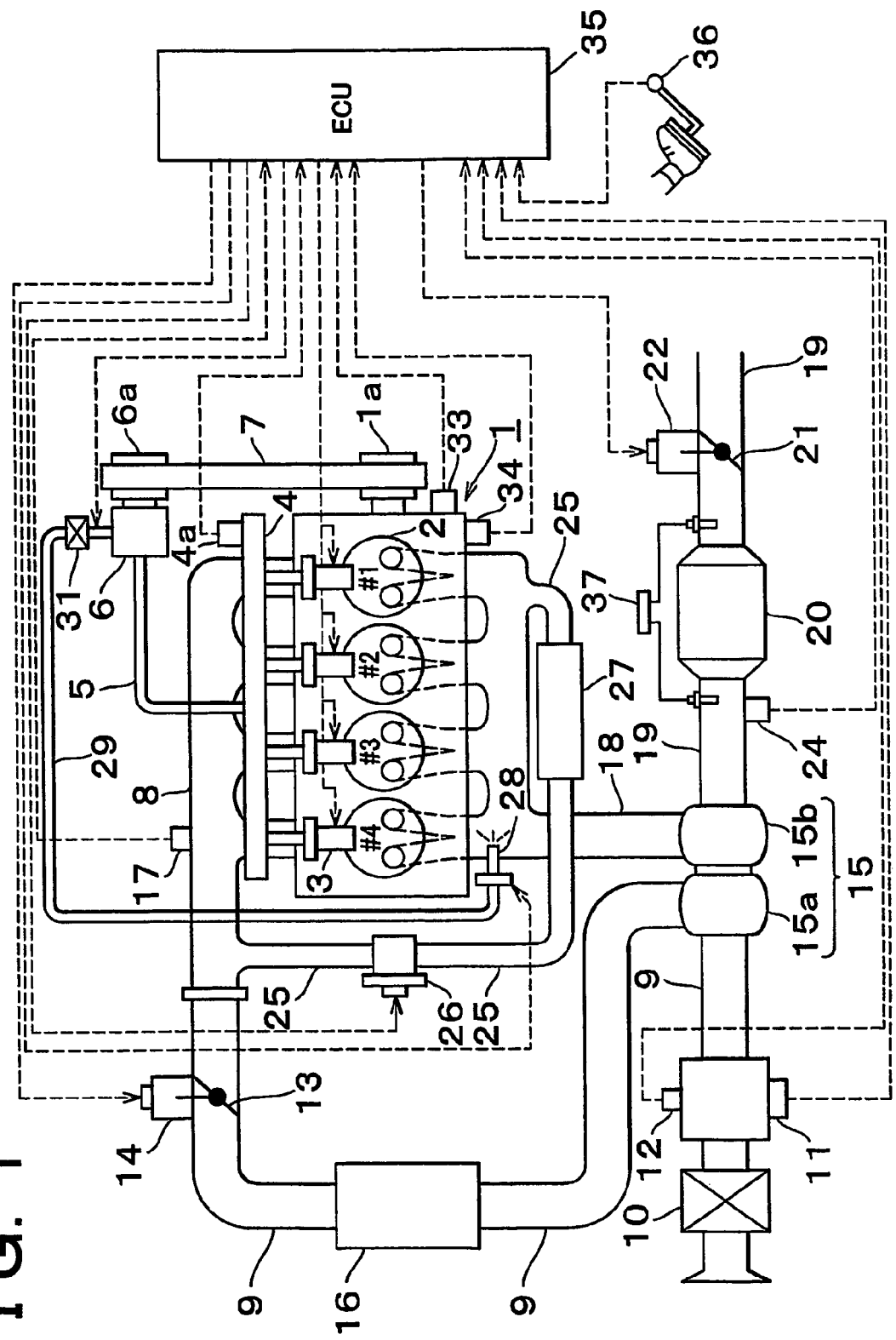
FIG. 1 schematically shows the structure of a diesel engine which has exhaust and intake systems and to which an exhaust gas purifying device for an internal combustion engine according to an embodiment of the invention is applied.

FIG. 1 schematically shows the structure of an internal combustion engine 1 which has intake and exhaust systems and to which the exhaust gas purifying device according to this embodiment is applied.

The internal combustion engine 1 shown in FIG. 1 is a water-cooled four-cycle diesel engine having four cylinders 2.

The internal combustion engine 1 has fuel injection valves 3 each injecting fuel directly into a combustion chamber of a corresponding one of the cylinders 2. Each of the fuel injection valves 3 is connected to an accumulator (common rail) 4 for accumulating fuel until a predetermined pressure is reached. The common rail 4 is provided with a common rail pressure sensor 4*a* for outputting an electric signal corresponding to a fuel pressure in the common rail 4.

The common rail 4 communicates with a fuel pump 6 via a fuel supply pipe 5. The fuel pump 6 operates using a rotational torque of an output shaft (crank shaft) of the internal combustion engine 1 as a driving source. A pump pulley 6*a* attached to an input shaft of the fuel pump 6 is connected via a belt 7 to a crank pulley 1*a* attached to the output shaft (crank shaft) of the internal combustion engine 1.

In the fuel injection system thus constructed, if a rotational torque of the crank shaft is transmitted to the input shaft of the fuel pump 6, the fuel pump 6 discharges fuel at a pressure corresponding to the rotational torque transmitted from the crank shaft to the input shaft of the fuel pump 6.

The fuel discharged from the fuel pump 6 is supplied to the common rail 4 via the fuel supply pipe 5, accumulated in the common rail 4 until the predetermined pressure is reached, and distributed to the fuel injection valves 3 in the cylinders 2. If a driving current is applied to the fuel injection valves 3, the fuel injection valves 3 are opened. As a result, fuel is injected from each of the fuel injection valves 3 into a corresponding one of the cylinders 2.

An intake branch pipe 8 is connected to the internal combustion engine 1. Each branch of the intake branch pipe 8 communicates with the combustion chamber of a corresponding one of the cylinders 2 via an intake port (not shown).

The intake branch pipe 8 is connected to an intake pipe 9, which is connected to an air cleaner box 10. An air flow meter 11 and an intake temperature sensor 12 are attached to the intake pipe 9 downstream of the air cleaner box 10. The air flow meter 11 outputs an electric signal corresponding to the mass of intake air flowing through the intake pipe 9. The intake temperature sensor 12 outputs an electric signal corresponding to the temperature of intake air flowing through the intake pipe 9.

An intake throttle valve 13 for adjusting the flow rate of intake air flowing through the intake pipe 9 is disposed in the intake pipe 9 immediately upstream of the intake branch pipe 8. An intake throttle actuator 14 is attached to the intake throttle valve 13. The intake throttle actuator 14 is composed of a stepper motor and the like and drives the intake throttle valve 13 in opening and closing directions.

A compressor housing 15a for a centrifugal supercharger (turbocharger) 15 that operates using hydro-dynamic energy of exhaust gas as a driving source is disposed in the intake pipe 9 between the air flow meter 11 and the intake throttle valve 13. An inter cooler 16 for cooling intake air that has reached a high temperature as a result of compression in the compressor housing 15a is disposed in the intake pipe 9 downstream of the compressor housing 15a.

In the intake system thus constructed, intake air that has flown into the air cleaner box 10 is removed of dust, dirt, or the like by an air cleaner (not shown) in the air cleaner box 10, and then flows into the compressor housing 15a via the intake pipe 9.

The intake air that has flown into the compressor housing 15a is compressed by the rotation of a compressor wheel, which is fitted in the compressor housing 15a. The intake air that has reached a high temperature as a result of compression in the compressor housing 15a is cooled in the inter cooler 16 and flows into the intake branch pipe 8 if necessary, the intake throttle valve 13 adjusts the flow rate of the intake air. The intake air that has flown into the intake branch pipe 8 is distributed to the combustion chamber of each of the cylinders 2 via a corresponding one of the branches and ignited using fuel injected from a corresponding one of the fuel injection valves 3 as an ignition source.

On the other hand, an exhaust branch pipe 18 is connected to the internal combustion engine 1. Each branch of the exhaust branch pipe 18 communicates with the combustion chamber of a corresponding one of the cylinders 2 via an exhaust port (not shown).

The exhaust branch pipe 18 is connected to a turbine housing 15b of the centrifugal supercharger 15. The turbine housing 15b is connected to an exhaust pipe 19, which is connected downstream thereof to a muffler (not shown).

The exhaust pipe 19 extends across a particulate filter (hereinafter, simply referred to as filter) 20 crying an occlusion/reduction-type NOx catalyst. An exhaust temperature sensor 24 for outputting an electric signal corresponding to the temperature of exhaust gas flowing through the exhaust pipe 19 is attached to the exhaust pipe 19 upstream of the filter 20.

A differential pressure sensor 37 is provided in order to detect the difference in pressure in the exhaust pipe 19 between upstream and downstream sides of the filter 20.

An exhaust throttle valve 21 for adjusting the flow rate of exhaust gas flowing through the exhaust pipe 19 is disposed in the exhaust pipe 19 downstream of the filter 20. An exhaust throttle actuator 22 is attached to the exhaust throttle valve 21. The exhaust throttle actuator 22 is composed of a stepper motor and the like and drives the exhaust throttle valve 21 in opening and closing directions.

In the exhaust system thus constructed, a mixture (burnt gas) burnt in each of the cylinders 2 of the internal combustion engine 1 is discharged to the exhaust branch pipe 18 via the exhaust port and then flows from the exhaust branch pipe 18 into the turbine housing 15b of the centrifugal supercharger 15. The exhaust gas that has flown into the turbine housing 15b rotates a turbine wheel with the aid of its hydro-dynamic energy. The turbine wheel is rotatably supported in the turbine housing 15b. In this case, a rotational torque of the turbine wheel is transmitted to the compressor wheel in the compressor housing 15a mentioned above.

Exhaust gas discharged from the turbine housing 15b flows into the filter 20 via the exhaust pipe 19. PMs contained in exhaust gas are collected and noxious gas components contained in exhaust gas are removed or purified. The exhaust gas whose PMs have been collected by the filter 20 and whose noxious gas components have been removed or purified by the filter 20 is discharged into the atmosphere via the muffler. If necessary, the exhaust throttle valve 21 adjusts the flow rate of the exhaust gas.

The exhaust branch pipe 18 and the intake branch pipe 8 communicate with each other via an exhaust gas recirculation passage (hereinafter, referred to as EGR passage) 25 through which part of the exhaust gas flowing through the exhaust branch pipe 18 is recirculated into the intake branch pipe 8. The EGR passage 25 extends across a flow rate adjusting valve (hereinafter, referred to as EGR valve) 26. The flow rate adjusting valve 26 is composed of an electromagnetic valve and the like and changes the flow rate of exhaust gas flowing through the EGR passage 25 (hereinafter, referred to as EGR gas) in accordance with the power applied.

An EGR cooler 27 for cooling EGR gas flowing through the EGR passage 25 is disposed in the EGR passage 25 upstream of the EGR valve 26. The EGR cooler 27 is provided with a coolant passage (not shown), through which part of coolant for cooling the internal combustion engine 1 circulates.

In the exhaust gas recirculation mechanism thus constructed, the EGR passage 25 becomes passable if the EGR valve 26 is opened. Part of the exhaust gas flowing through the exhaust branch pipe 18 flows into the EGR passage 25, flows through the EGR cooler 27, and is introduced into the intake branch pipe 8.

In this case, heat is exchanged in the EGR cooler 27 between EGR gas flowing through the EGR passage 25 and coolant of the internal combustion engine 1. As a result, the EGR gas is cooled.

The EGR gas recirculated from the exhaust branch pipe 18 to the intake branch pipe 8 via the EGR passage 25 mixes with a new air that has flown from an upstream portion of the intake branch pipe 8, and is introduced into the combustion chambers of the cylinders 2.

It is to be noted herein that EGR gas contains inert gas components that do not burn by themselves and that have a high thermal capacity, such as water ($H_2O$) and carbon dioxide ($CO_2$). Therefore, the combustion temperature of a mixture is low if the mixture contains EGR gas. As a result, the generation amount of nitrogen oxides (NOx) is reduced.

Furthermore, if EGR gas is cooled in the EGR cooler 27, the temperature of the EGR gas itself drops and the volume thereof is reduced. Thus, when EGR gas is supplied to a certain one of the combustion chambers, the atmospheric temperature in the combustion chamber does not unnecessarily rise, and the amount (volume) of a new air supplied to the combustion chamber does not unnecessarily decrease either.

In this embodiment, low-temperature combustion is conducted in which the amount of EGR gas is increased during low load operation as compared to normal operation, and removal of PMs, purification of NOx and heat-up control of the filter 20 are conducted. The low-temperature combustion will now be described.

As described above, EGR is conventionally used to suppress generation of NOx. EGR gas has a relatively high specific heat ratio, and a large amount of heat is required to raise the temperature of the EGR gas. Therefore, the combustion temperature in the cylinders 2 is reduced as the ratio of the EGR gas in intake air is increased. Since the generation amount of NOx is reduced with reduction in combustion temperature, the discharge amount of NOx can be reduced with increase in the EGR gas ratio.

However, as the EGR gas ratio is increased, the generation amount of soot starts increasing sharply from a certain EGR gas ratio. Therefore, EGR control is normally conducted at an EGR gas ratio that is lower than that value.

As the EGR gas ratio is further increased, the amount of soot is increases shapely as described above. However, there is a peak in the generation amount of soot. If the EGR gas ratio is increased beyond this peak, the generation amount of soot starts being reduced sharply, and finally soot is hardly generated.

The reason for this is as follows: when the temperature of the fuel and the gas around the fuel during combustion in the combustion chambers is equal to or lower than a certain value, hydrocarbons (HC) stop growing before becoming soot. When the temperature of the fuel and the gas around the fuel becomes equal to or higher than a certain value, hydrocarbons (HC) rapidly grow to soot.

Accordingly, no soot will be generated if the temperature of the fuel and the gas around the fuel during combustion in the combustion chambers is suppressed to at most a value that stops growth of hydrocarbons (HC). In this case, the temperature of the fuel and the gas around the fuel is greatly affected by the endothermic effect of the gas around the fuel during combustion of the fuel. Therefore, generation of soot can be suppressed by adjusting the amount of heat absorbed by the gas around the fuel, that is, the EGR gas ratio, according to the amount of heat generated by combustion of the fuel.

Figure 3:
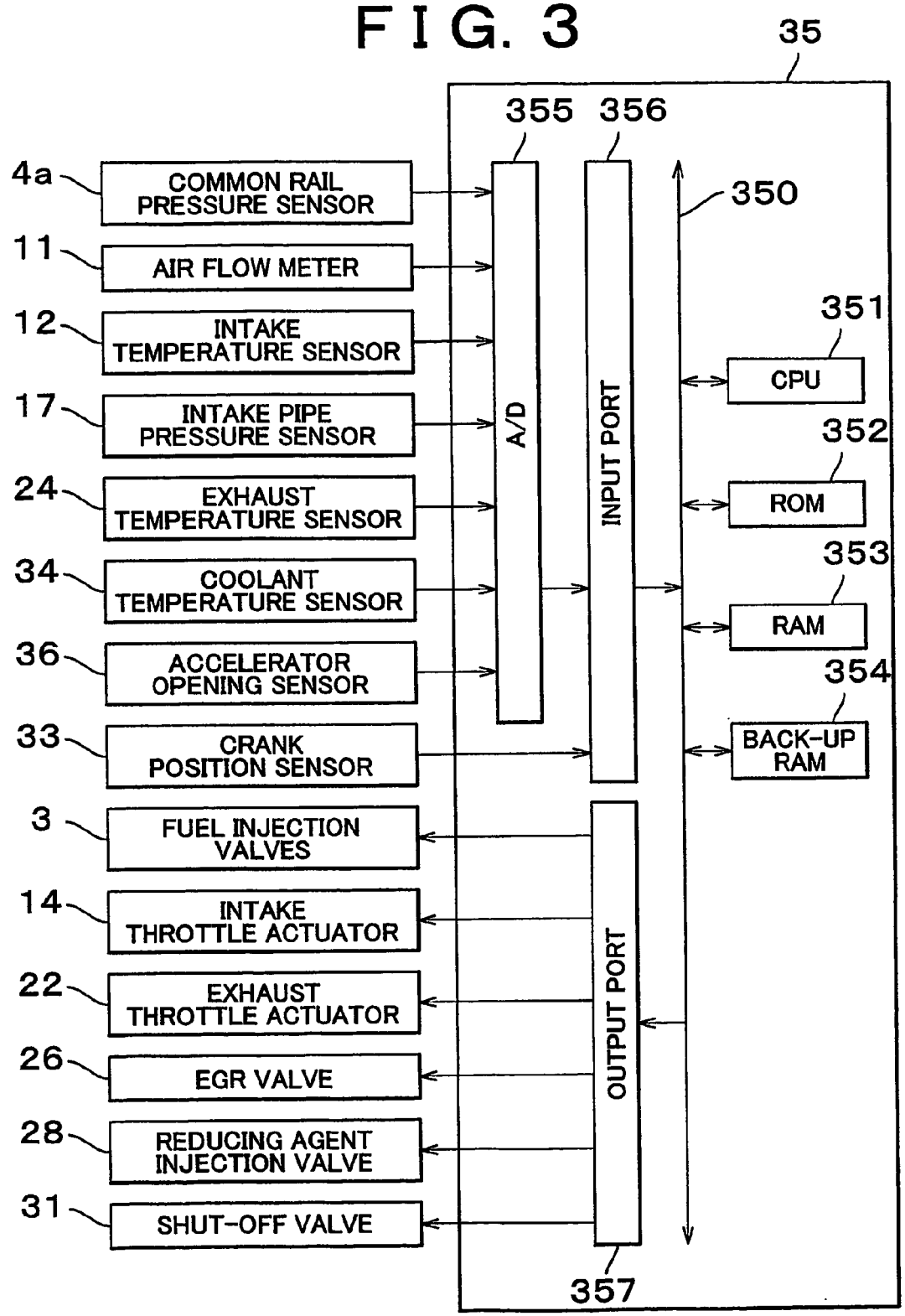
FIG. 3 is a block diagram showing the internal structure of an ECU that is applied to the exhaust gas purifying device for the internal combustion engine according to the embodiment.
Figure 4:
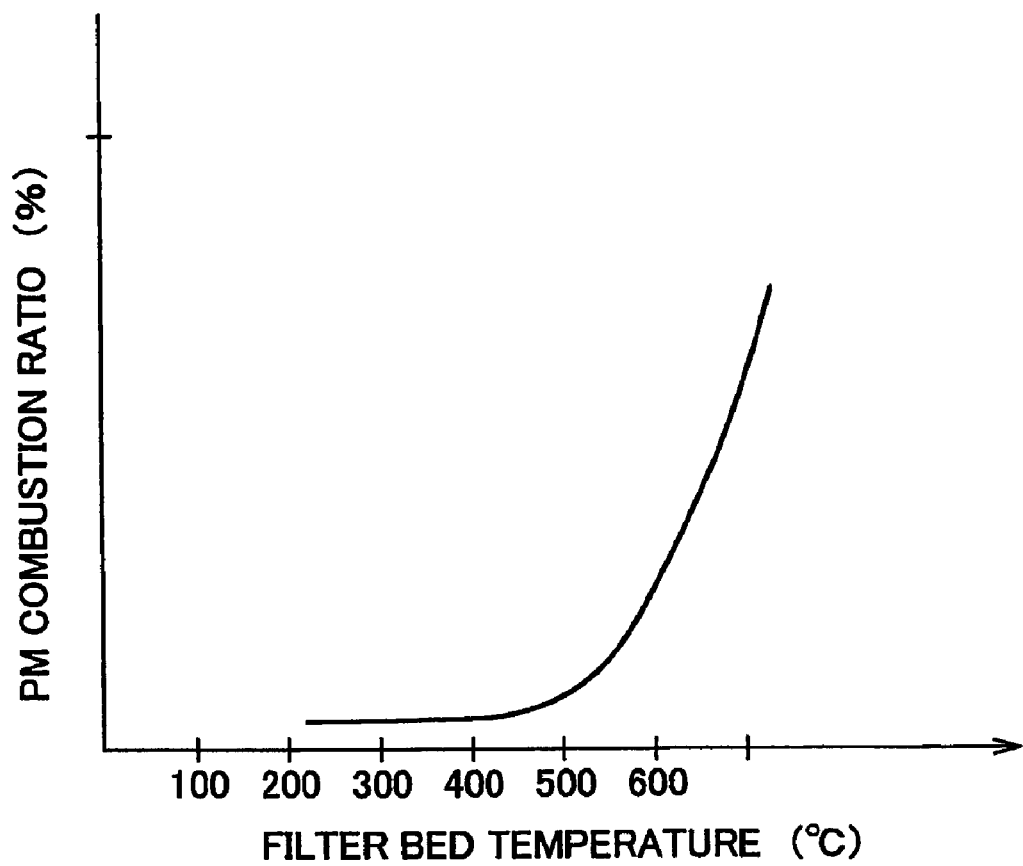
FIG. 4 shows the relation between the bed temperature of the particulate filter in FIGS. 2A and 2B and combustion of PMs.

The EGR gas ratio for the low-temperature combustion is obtained in advance by experimentation or the like, and a map of the EGR gas ratio is pre-stored in a ROM (Read Only Memory) 352 in an ECU 35 (as shown in FIG. 3). The EGR gas amount is feedback-controlled based on this map.

Hydrocarbons (HC) that have stopped growing before becoming soot can be burnt by using an oxidizing agent or the like carried on the filter 20.

The low-temperature combustion is thus basically conducted by purifying hydrocarbons (HC) that have stopped growing before becoming soot by using an oxidizing agent or the like. Accordingly, in the case where the oxidizing agent or the like is inactive, hydrocarbons (HC) are discharged to the atmosphere without being purified, and it is therefore difficult to use the low-temperature combustion.

Moreover, it is during relatively low load operation which generates a small amount of heat by combustion that the temperature of the fuel and the gas around the fuel during combustion in the cylinders 2 can be controlled to at most a value that stops growth of hydrocarbons (HC).

Accordingly, since the internal combustion engine 1 remains in a low revolution, low load operational state in this embodiment, low-temperature combustion control is conducted when the occlusion/reduction-type NOx catalyst carried on the filter 20 reaches an active region. Whether the occlusion/reduction-type NOx catalyst is in the active region or not can be determined based on an output signal of the exhaust temperature sensor 24 or the like.

In the low-temperature combustion, NOx can thus be reduced and purified by supplying hydrocarbons (HC) serving as a reducing agent to the occlusion/reduction-type NOx catalyst while suppressing discharge of PMs such as soot. The temperature of the filter 20 can be raised by the heat generated as a result of the reduction and purification of NOx.

Accordingly, in this embodiment, the bed temperature of the filter 20 is raised by conducting the low-temperature combustion as necessary. In this case, heat-up control is conducted with the air-fuel ratio varied depending on a target temperature. In other words, when the target temperature is high, the heat-up control is conducted at a low air-fuel ratio. A desired air-fuel ratio can be obtained by adjusting the amount of EGR gas.

Note that post-injection is conducted in order to obtain a rich air-fuel ratio of exhaust gas by injecting fuel in an expansion stroke or exhaust stroke after primary injection.

Figure 2A:
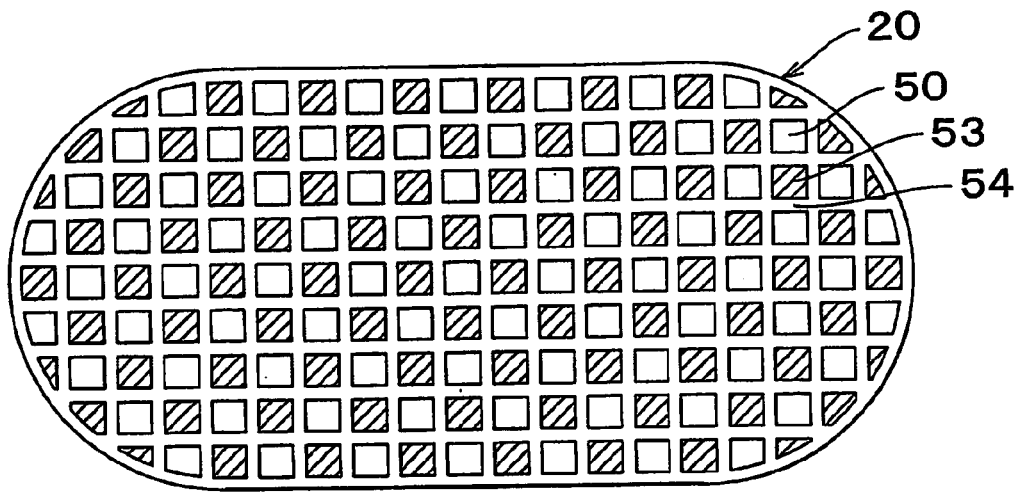
FIG. 2A is a transverse sectional view of a particulate filter that is applied to the exhaust gas purifying device for the internal combustion engine according to the embodiment.
Figure 2B:
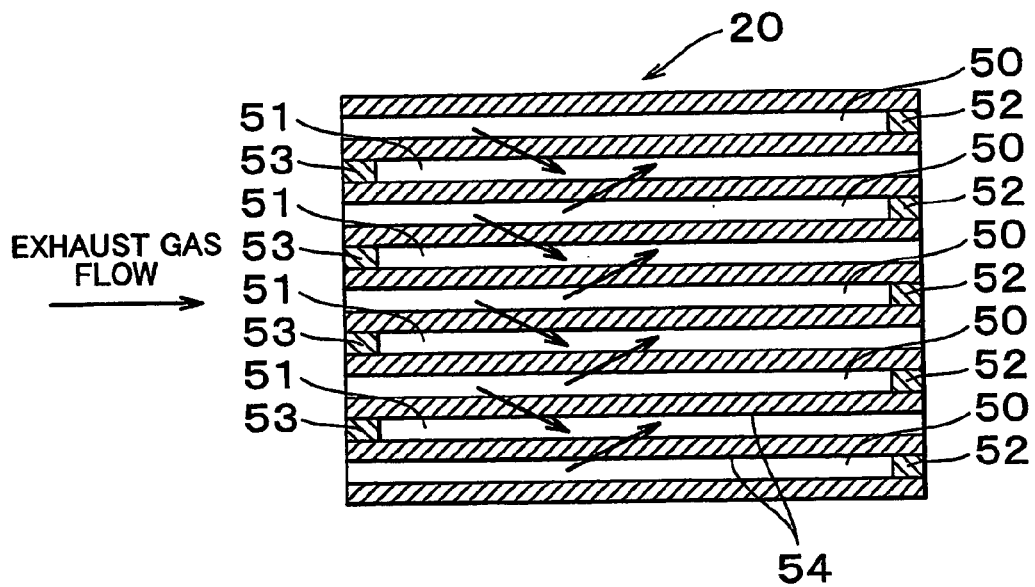
FIG. 2B is a longitudinal sectional view of the particulate filter in FIG. 2A.

The filter 20 according to this embodiment will now be described. FIGS. 2A and 2B show cross-sections of the filter 20. FIG. 2A is a transverse sectional view of the filter 20. FIG. 2B is a longitudinal sectional view of the filter 20.

As shown in FIGS. 2A and 2B, the filter 20 is of so-called wall-flow type and has a plurality of exhaust gas flow passages 50, 51 extending parallel to one another. These exhaust gas flow passages are composed of exhaust gas inflow passages 50 with their downstream ends closed by plugs 52 and exhaust gas outflow passages 51 with their upstream ends closed by plugs 53. Note that hatched areas in FIG. 2A indicate the plugs 53. Accordingly, the exhaust gas inflow passages 50 and the exhaust gas outflow passages 51 are disposed alternately with the interposition of thin partitions 54. In other words, the exhaust inflow passages 50 and the exhaust outflow passages 51 are disposed such that each of the exhaust gas inflow passages 50 is surrounded by four of the exhaust gas outflow passages 51 and that each of the exhaust gas outflow passages 51 is surrounded by four of the exhaust gas inflow passages 50.

The filter 20 is made of a porous material such as cordierite. Thus, as indicated by arrows in FIG. 2B, exhaust gas that has flown into the exhaust gas inflow passages 50 flows out into adjacent ones of the exhaust gas outflow passages 51 through surrounding ones of the partitions 54.

In the embodiment of the invention, carrier layers made of alumina or the like are formed on a peripheral wall surface of each of the exhaust gas inflow passages 50 and a peripheral wan surface of each of the exhaust gas outflow passages 51, namely, both surfaces of each of the partitions 54, and on inner wall surfaces of pores formed in the partitions 54. The occlusion/reduction-type NOx catalyst is carried on the carrier layers.

Hereinafter, functions of the occlusion/reduction-type NOx catalyst carried on the filter according to this embodiment will be described.

For example, the filter 20 has a carrier made of alumina, and at least one material selected from an alkine metal such as potassium (K), sodium (Na), lithium (Li), or cesium (Cs), an alkine earth such as barium (Ba) or calcium (Ca), and a rare earth such as lanthanum (La) or yttrium (Y), and a noble metal such as platinum (Pt) are carried on the carrier. This embodiment adopts an occlusion/reduction-type NOx catalyst that is constructed by having barium (Ba) and platinum (Pt) carried on a carrier made of alumina and adding ceria ($Ce_2O_3$) capable of storing $O_2$ to the carrier.

The NOx catalyst thus constructed absorbs nitrogen oxides (NOx) contained in exhaust gas when exhaust gas flowing into the NOx catalyst exhibits a high oxygen concentration.

On the other hand, the NOx catalyst discharges the absorbed nitrogen oxides (NOx) if the oxygen concentration of exhaust gas flowing into the NOx catalyst decreases. In this case, if reducing components such as hydrocarbons (HC) and carbon monoxide (CO) exist in exhaust gas, the NOx catalyst can reduce the nitrogen oxides (NOx) discharged therefrom to nitrogen ($N_2$).

If the internal combustion engine 1 is in lean-burn operation, exhaust gas discharged from the internal combustion engine 1 exhibits a lean air-fuel ratio and a high oxygen concentration. Thus, the NOx catalyst absorbs nitrogen oxides (NOx) contained in the exhaust gas. However, if the internal combustion engine 1 remains in lean-burn operation for a long time, the NOx absorption capacity of the NOx catalyst reaches its limit. As a result, nitrogen oxides (NOx) contained in exhaust gas remain therein without being removed by the NOx catalyst.

Especially in the case of the internal combustion engine 1 constructed as a diesel engine, a mixture of lean air-fuel ratios is burnt in most operational ranges, and exhaust gas thus exhibits lean air-fuel ratios in most operational ranges. Therefore, the NOx absorption capacity of the NOx catalyst tends to reach its limit.

Thus, if the internal combustion engine 1 is in lean-burn operation, it is necessary to decrease the concentration of oxygen contained in exhaust gas flowing into the NOx catalyst, increase the concentration of a reducing agent, and discharge and reduce nitrogen oxides (NOx) absorbed by the NOx catalyst before the NOx absorption capacity of the NOx catalyst reaches its limit.

As methods of thus decreasing the oxygen concentration, addition of fuel to exhaust gas, the aforementioned low-temperature combustion, a shift of the timing or number of times of fuel injection into the cylinders 2, and the like are conceivable. This embodiment employs a reducing agent supply mechanism for adding fuel (light oil) serving as a reducing agent to exhaust gas flowing through the exhaust pipe 19 upstream of the filter 20. The reducing agent supply mechanism adds fuel to exhaust gas, whereby the concentration of oxygen contained in exhaust gas flowing into the filter 20 is decreased, and the concentration of the reducing agent is increased.

As shown in the figure, the reducing agent supply mechanism is provided with a nozzle hole that is directed toward the inside of the exhaust branch pipe 18. The reducing agent supply mechanism has a reducing agent injection valve 28, a reducing agent supply passage 29, and a shut-off valve 31. The reducing agent injection valve 28 opens in response to a signal from the ECU 35 and injects fuel. Fuel discharged from the fuel pump 6 is introduced into the reducing agent injection valve 28 through the reducing agent supply passage 29. The shut-off valve 31 is disposed in the reducing agent supply passage 29 to shut off the flow of fuel in the reducing agent supply passage 29.

In such a reducing agent supply mechanism, high-pressure fuel discharged from the fuel pump 6 is supplied to the reducing agent injection valve 28 via the reducing agent supply passage 29. The reducing agent injection valve 28 then opens in response to a signal from the ECU 35, and fuel serving as a reducing agent is injected into the exhaust branch pipe 18.

The reducing agent injected into the exhaust branch pipe 18 from the reducing agent injection valve 28 decreases the oxygen concentration of exhaust gas that has flown from an upstream portion of the exhaust branch pipe 18.

The exhaust gas thus formed and exhibiting a low oxygen concentration flows into the filter 20. Nitrogen oxides (NOx) absorbed by the filter 20 are discharged and reduced to nitrogen ($N_2$).

Then, the reducing agent injection valve 28 closes in response to a signal from the ECU 35, whereby the reducing agent is stopped from being added to the exhaust branch pipe 18.

In this embodiment, fuel is added by injection into exhaust gas. However, it is also appropriate that low-temperature combustion for further increasing the amount of EGR gas be performed after the generation amount of soot has reached its maximum through an increase in the recirculation amount of EGR gas. Further, it is also appropriate that fuel be injected from the fuel injection valves 3 in an expansion stroke, an exhaust stroke, or the like of the internal combustion engine 1.

The internal combustion engine 1 constructed as described above is provided with an electronic control unit (ECU) 35 for controlling the internal combustion engine 1. The ECU 35 controls the operational state of the internal combustion engine 1 in accordance with an operating condition of the internal combustion engine 1 or a driver's request.

Various sensors such as the common rail pressure sensor 4a, the air flow meter 11, the intake temperature sensor 12, an intake pipe pressure sensor 17, the exhaust temperature sensor 24, a crank position sensor 33, a coolant temperature sensor 34, and an accelerator opening sensor 36 are connected to the ECU 35 via electric wires. Output signals from these sensors are input to the ECU 35.

The fuel injection valves 3, the intake throttle actuator 14, the exhaust throttle actuator 22, the reducing agent injection valve 28, the EGR valve 26, the shut-off valve 31, and the like are connected to the ECU 35 via electric wires. The ECU 35 can control these components.

As shown in FIG. 3, the ECU 35 has a CPU (Central Processing Unit) 351, a ROM 352, a RAM (Random Access Memory) 353, a back-up RAM 354, an input port 356, and an output port 357, which are interconnected by a bidirectional bus 350. The ECU 35 also has an A/D converter (A/D) 355 connected to the input port 356.

Output signals from sensors designed to output digital signals, such as the crank position sensor 33, are input to the input port 356. These output signals are transmitted to the CPU 351 or the RAM 353 via the input port 356, Output signals from sensors designed to output analog signals, such as the common rail pressure sensor 4a, the air flow meter 11, the intake temperature sensor 12, the intake pipe pressure sensor 17, the exhaust temperature sensor 24, the coolant temperature sensor 34, and the accelerator opening sensor 36, are input to the input port 356 via the A/D 355. These output signals are transmitted to the CPU 351 or the RAM 353 via the input port 356.

The output port 357 is connected to the fuel injection valves 3, the intake throttle actuator 14, the exhaust throttle actuator 22, the EGR valve 26, the reducing agent injection valve 28, the shut-off valve 31, and the like via electric wires. Control signals output from the CPU 351 are transmitted to the fuel injection valves 3, the intake throttle actuator 14, the exhaust throttle actuator 22, the EGR valve 26, the reducing agent injection valve 28, and the shut-off valve 31 via the output port 357.

The ROM 352 stores application programs such as a fuel injection control routine for controlling the fuel injection valves 3, an intake throttle control routine for controlling the intake throttle valve 13, an exhaust throttle control routine for controlling the exhaust throttle valve 21, an EGR control routine for controlling the EGR valve 26, an NOx purification control routine for discharging absorbed NOx by adding a reducing agent to the filter 20, a poisoning elimination control routine for eliminating SOx poisoning of the filter 20, and a PM combustion control routine for burning and removing the PMs collected by the filter 20.

In addition to the aforementioned application programs, the ROM 352 stores various control maps. For example, the control maps include a fuel injection amount control map showing the relation between operational states of the internal combustion engine 1 and base fuel injection amounts (base fuel injection periods), a fuel injection timing control map showing the relation between operational states of the internal combustion engine 1 and base fuel injection timings, an intake throttle valve opening control map showing the relation between operational states of the internal combustion engine 1 and target openings of the intake throttle valve 13, an exhaust throttle valve opening control map showing the relation between operational states of the internal combustion engine 1 and target openings of the exhaust throttle valve 21, an EGR valve opening control map showing the relation between operational states of the internal combustion engine 1 and target openings of the EGR valve 26, a reducing agent addition amount control map showing the relation between operational states of the internal combustion engine 1 and target addition amounts of the reducing agent (or target air-fuel ratios of exhaust gas), a reducing agent injection valve control map showing the relation between target addition amounts of the reducing agent and opening periods of the reducing agent injection valve 28, and the like.

The RAM 353 stores output signals from the sensors, calculation results obtained from the CPU 351, and the like. For example, the calculation results include an engine speed that is calculated based on a time interval at which the crank position sensor 33 outputs a pulse signal. These data are updated every time the crank position sensor 33 outputs a pulse signal.

The back-up RAM 354 is a non-volatile memory capable of holding data even after the internal combustion engine 1 is stopped.

The CPU 351 operates in accordance with the application programs stored in the ROM 352 and performs fuel injection valve control, intake throttle control, exhaust throttle control, EGR control, NOx purification control, poisoning elimination control, PM combustion control, and the like.

For example, during NOx purification control, the CPU 351 performs so-called rich spike control in which the concentration of oxygen contained in exhaust gas flowing into the filter 20 is decreased in a spike manner on a relatively short cycle (in a short period).

In rich spike control, the CPU 351 determines on a predetermined cycle whether or not a condition for performing rich spike control has been fulfilled. For example, this condition for performing rich spike control is that the filter 20 has been activated, that the output signal value of the exhaust temperature sensor 24 (exhaust gas temperature) is equal to or smaller than a predetermined upper limit value, that poisoning elimination control is not being performed, or the like.

If it is determined that the condition for performing rich spike control as described above has been fulfilled, the CPU 351 controls the reducing agent injection valve 28 so as to inject fuel serving as a reducing agent from the reducing agent injection valve 28 in a spike manner. Thus, the CPU 351 temporarily makes the air-fuel ratio of exhaust gas flowing into the filter 20 equal to a predetermined target rich air-fuel ratio.

More specifically, the CPU 351 reads an engine speed stored in the RAM 353, an output signal of the accelerator opening sensor 36 (accelerator opening), an output signal value of the air flow meter 11 (intake air amount), an output signal of the air-fuel ratio sensor, a fuel injection amount, and the like.

Using the engine speed, the accelerator opening, the intake air amount, and the fuel injection amount as parameters, the CPU 351 accesses the reducing agent addition amount control map stored in the ROM 352 and calculates an addition amount (target addition amount) of the reducing agent required to make the air-fuel ratio of exhaust gas equal to a preset target air-fuel ratio.

Using the target addition amount as a parameter, the CPU 351 then accesses the reducing agent injection valve control map stored in the ROM 352 and calculates an opening period (target opening period) of the reducing agent injection valve 28 required to inject the target addition amount of the reducing agent from the reducing agent injection valve 28.

If the target opening period of the reducing agent injection valve 28 is calculated, the CPU 351 opens the reducing agent injection valve 28.

If the target opening period has elapsed after the opening of the reducing agent injection valve 28, the CPU 351 closes the reducing agent injection valve 28.

If the reducing agent injection valve 28 is thus opened for the target opening period, the target addition amount of fuel is injected from the reducing agent injection valve 28 into the exhaust branch pipe 18. The reducing agent injected from the reducing agent injection valve 28 mixes with exhaust gas that has flown from an upstream portion of the exhaust branch pipe 18, forms a mixture having the target air-fuel ratio, and flows into the filter 20.

As a result, the oxygen concentration of exhaust gas flowing into the filter 20 changes on a relatively short cycle. Thus, the filter 20 repeats the absorption of nitrogen oxides (NOx) and the discharge/reduction of nitrogen oxides (NOx) alternately on a short cycle.

In poisoning elimination control, the CPU 351 performs a poisoning elimination process so as to eliminate poisoning of the filter 20 by oxides.

It is to be noted herein that the internal combustion engine 1 may use a fuel containing sulfur (S). If such a fuel burns in the internal combustion engine 1, sulfur oxides (SOx) such as sulfur dioxide ($SO_2$) and sulfur troxide ($SO_3$) are produced.

Sulfur oxides (SOx) flow into the filter 20 together with exhaust gas and are absorbed by the filter 20 according to the same mechanism as in the case of nitrogen oxides (NOx).

More specifically, if exhaust gas flowing into the filter 20 exhibits a high oxygen concentration, sulfur oxides (SOx) contained in the exhaust gas, such as sulfur dioxide ($SO_2$) and sulfur trioxide ($SO_3$), are oxidized on the surface of platinum (Pt) and are absorbed by the filter 20 in the form of sulfate ions ($SO_4^{2-}$). The sulfate ions ($SO_4^{2-}$) thus absorbed by the filter 20 bond to barium oxide (BaO) and form barium sulfate ($BaSO_4$).

It is to be noted herein that barium sulfate ($BaSO_4$) is stabler and less likely to be decomposed than barium nitrate ($Ba(NO_3)_2$). Even if the oxygen concentration of exhaust gas flowing into the filter 20 decreases, barium sulfate ($BaSO_4$) remains in the filter 20 without being decomposed.

If the amount of barium sulfate ($BaSO_4$) in the filter 20 increases, the amount of barium oxide (BaO) that can contribute to the absorption of nitrogen oxides (NOx) decreases accordingly. This leads to so-called sulfur poisoning, which causes deterioration in the NOx absorption capability of the filter 20.

According to one exemplary method for eliminating sulfur poisoning of the filter 20, the atmospheric temperature of the filter 20 is raised to a high temperature range of about 600 to 650° C., and the oxygen concentration of exhaust gas flowing into the filter 20 is decreased. As a result, barium sulfate ($BaSO_4$) absorbed by the filter 20 is thermally decomposed into $SO_3^-$ and $SO_4^-$. Then, $SO_3^-$ and $SO_4^-$ are caused to react with hydrocarbons (HC) and carbon monoxide (CO) contained in exhaust gas and reduced to gaseous $SO_2^-$.

Thus, the poisoning recovery process according to this embodiment is designed such that the CPU 351 first performs catalyst heat-up control for raising the bed temperature of the filter 20 and then decreases the oxygen concentration of exhaust gas flowing into the filter 20.

In catalyst heat-up control, the CPU 351 may be designed, for example, to inject fuel from each of the fuel injection valves 3 secondarily during an expansion stroke of a corresponding one of the cylinders 2, add the fuel to exhaust gas from the reducing agent injection valve 28 to oxidize unburnt components of the fuel in the filter 20, and raise the bed temperature of the filter 20 by means of heat generated through the oxidation.

However, if the filter 20 is heated up excessively, thermal degradation of the filter 20 may be induced. It is therefore preferable to perform feedback control of the secondary injection amount of fuel and the addition amount of fuel based on an output signal value of the exhaust temperature sensor 24.

If the bed temperature of the filter 20 rises to a high temperature range of about 600 to 650° C. through the aforementioned catalyst heat-up process, the CPU 351 causes fuel to be injected from the reducing agent injection valve 28 so as to decrease the oxygen concentration of exhaust gas flowing into the filter 20.

If an excessive amount of fuel is injected from the reducing agent injection valve 28, the fuel may burn in the filter 20 abruptly and overheat the filter 20. Otherwise, the filter 20 may be cooled unnecessarily by the excessive amount of fuel injected from the reducing agent injection valve 28. It is therefore preferable that the CPU 351 perform feedback control of the fuel injection amount from the reducing agent injection valve 28 based on an output signal of an air-fuel ratio sensor (not shown).

If the poisoning recovery process is thus performed, the oxygen concentration of exhaust gas flowing into the filter 20 decreases under the condition that the bed temperature of the filter 20 is high. Then, barium sulfate ($BaSO_4$) absorbed by the filter 20 is thermally decomposed into $SO_3^-$ and $SO_4^-$. The $SO_3^-$ and $SO_4^-$ react with hydrocarbons (HC) and carbon monoxide (CO) contained in exhaust gas and are reduced, whereby the filter 20 is recovered from the sulfur poisoning.

Hereinafter, a flow of heat-up control and sulfur poisoning recovery control according to this embodiment will be described.

Figure 5A:
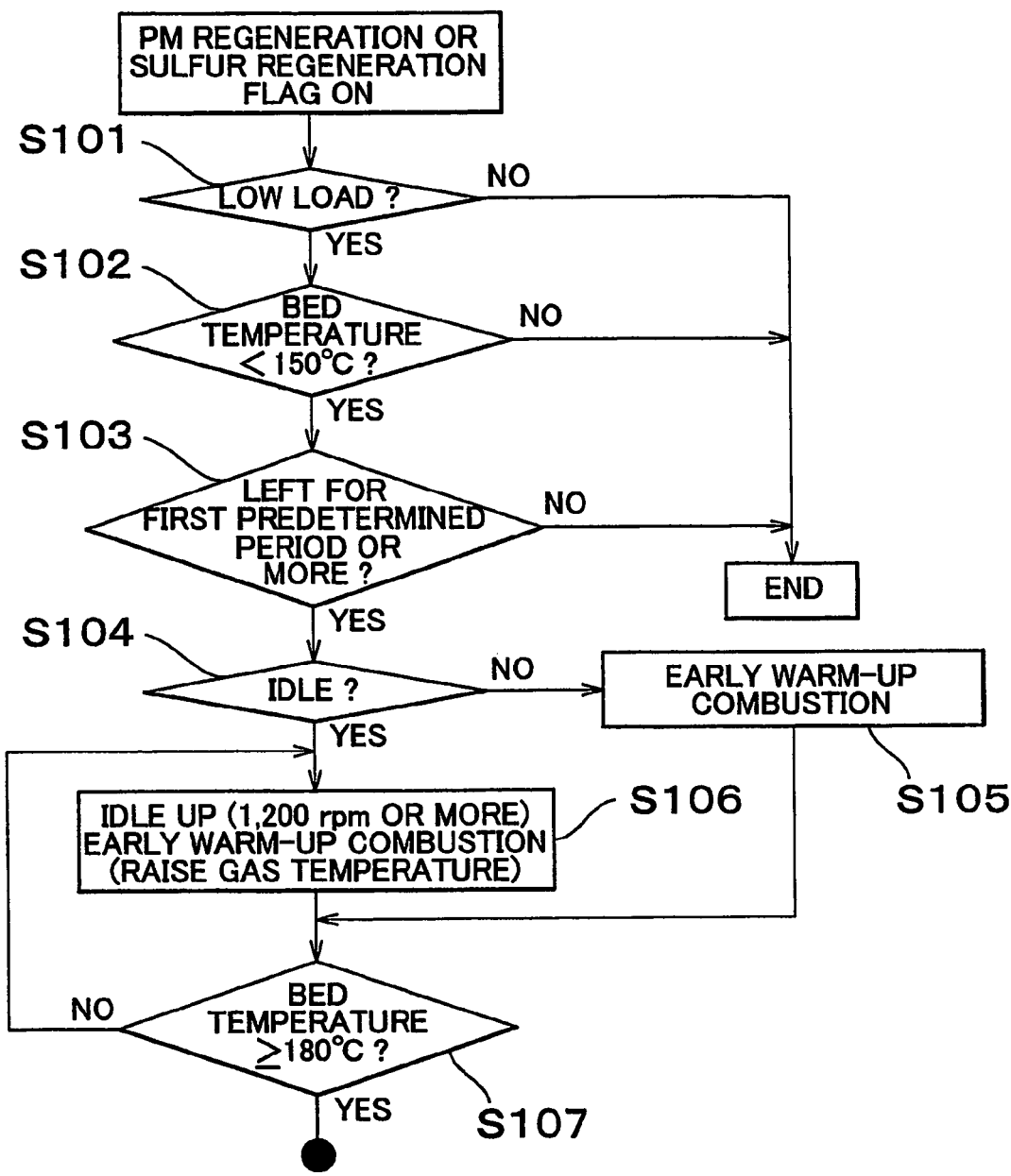
FIG. 5A and FIG. 5*b* are flowcharts for executing heat-up control that is applied to the exhaust gas purifying device for the internal combustion engine according to the embodiment of the invention.
Figure 5B:
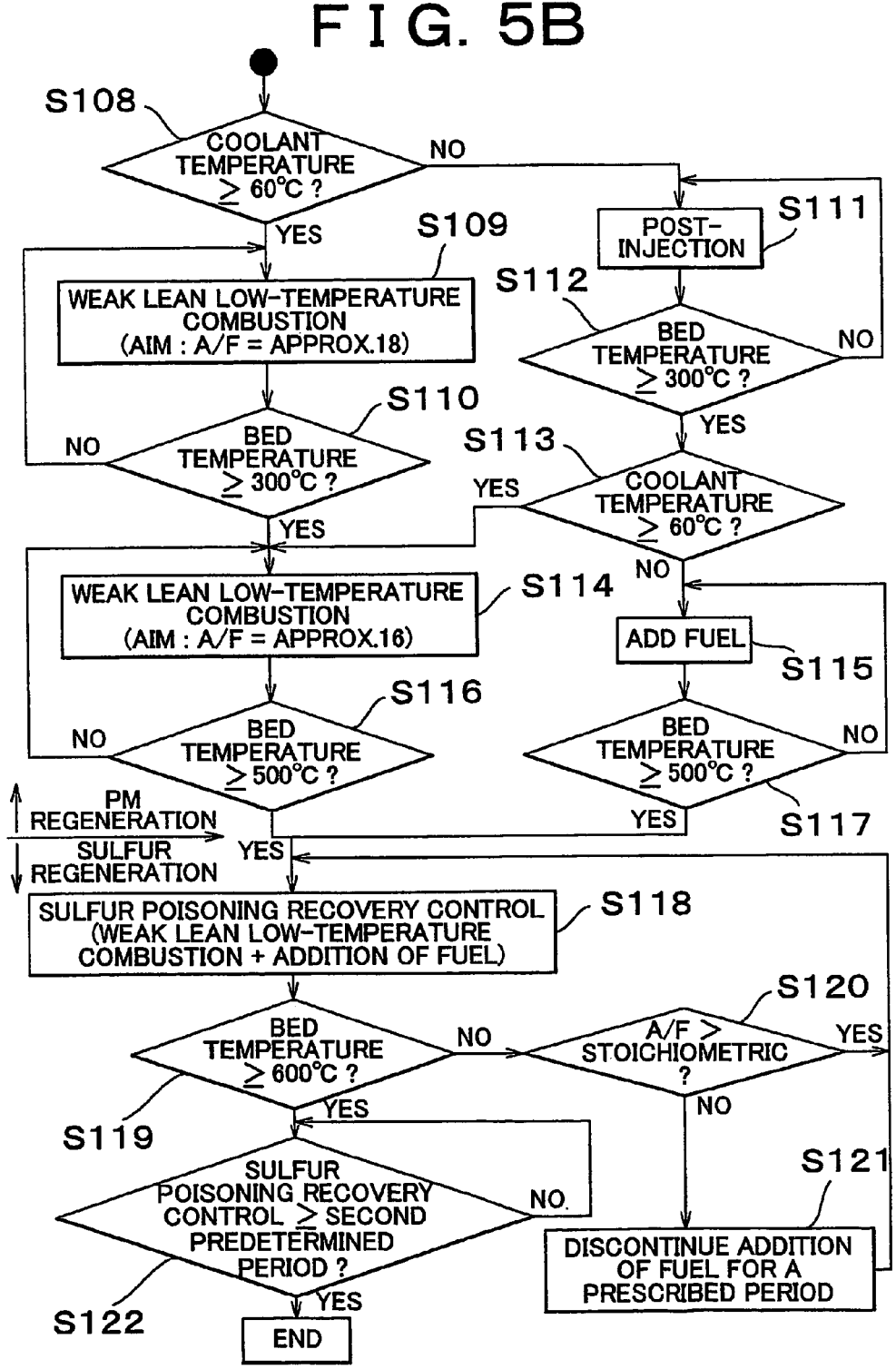

FIGS. 5A and 5B are flowcharts for executing heat-up control according to this embodiment. This control is started if removal of fine particles by oxidation (hereinafter, referred to as PM recovery or PM regeneration) or recovery from sulfur poisoning is to be performed, that is, if a flag indicating that these controls are to be executed is ON.

The sulfur poisoning recovery control is started based on the total fuel consumption, an output signal from a NOx sensor (not shown), a vehicle running distance, and the like. Since sulfur components contained in fuel poison the occlusion/reduction-type NOx catalyst carried on the filter 20, the total fuel consumption may be stored in the RAM 353 and the sulfur poisoning recovery control may be started when the addition amount of fuel reaches a predetermined value. As the sulfur poisoning proceeds, the amount of NOx absorbed by the occlusion/reduction-type NOx catalyst decreases and the amount of NOx flowing downstream of the filter 20 increases. Therefore, a NOx sensor (not shown) may be disposed downstream of the filter 20. In this case, an output signal of the NOx sensor may be monitored, and the sulfur poisoning recovery control may be started when the amount of NOx flowing downstream of the filter 20 reaches a predetermined value or more. Moreover, when the vehicle running distance reaches a predetermined value or more, it is determined that recovery from sulfur poisoning is required, and a sulfur poisoning recovery control flag is set.

In the case of PM recovery, if the difference in pressure in the exhaust pipe 19 between the upstream and downstream sides of the filter 20, which is detected by the differential pressure sensor 37, reaches a predetermined value or more, it can be estimated that at least a prescribed amount of PMs has been accumulated on the filter 20. Thus, a PM recovery control flag is set if at least a prescribed amount of PMs is accumulated.

If the sulfur poisoning recovery flag or the PM recovery flag is ON, the routine proceeds to step S101.

In step S101, it is determined whether the internal combustion engine 1 is in a low load state or not. If the internal combustion engine 1 is not in the low load state, it is determined that PM recovery and the like need not be performed based on the heat-up control. Therefore, the routine is terminated.

On the other hand, if the internal combustion engine 1 is in the low load state, the routine proceeds to step S102. In step S102, it is determined whether or not the bed temperature of the filter 20 is less than 150° C. The temperature of the filter 20 is estimated by using the exhaust temperature sensor 24 disposed in the exhaust pipe 19 immediately upstream of the filter 20. If the temperature of the filter 20 is less than 150° C., the catalyst is not activated and effective exhaust purification cannot be carried out.

If the bed temperature of the filter 20 is less than 150° C., the routine proceeds to step S103. If the bed temperature of the filter 20 is equal to or higher than 150° C., the control is terminated. In this case, removal of fine particles by oxidation and recovery from sulfur poisoning are performed according to normal heat-up control and the like.

In step S103, it is determined whether or not the internal combustion engine 1 has been left in the low load state and the bed temperature of the filter 20 has been held at less than 150° C. for a predetermined period (first predetermined period) or more. The first predetermined period is determined in view of various factors. For example, the first predetermined period may be fifteen minutes.

If the internal combustion engine 1 has been left in the low load state and the bed temperature of the filter 20 has been held at less than 150° C. for the first predetermined period or more, the routine proceeds to step S104. Otherwise, the control is terminated.

In step S104, it is determined whether the internal combustion engine 1 is in an idle state or not. For example, if the engine speed of the internal combustion engine 1 is about 750 rpm, it is determined that the internal combustion engine 1 is in the idle state, and the routine proceeds to step S106. Otherwise, the routine proceeds to step S105, and early warm-up combustion is conducted.

In step S106, the engine speed of the internal combustion engine 1 is raised to 1,200 rpm and the early warm-up combustion is conducted. The routine then proceeds to step S107.

The early warm-up combustion is conducted in order to raise the temperature of the filter 20. Hereinafter, exemplary methods of the early warm-up combustion will be described.

A first exemplary method is to retard the fuel injection timing to the top dead center of a compression stroke or later during combustion of the internal combustion engine 1. In normal combustion, primary fuel is injected near the top dead center of a compression stroke. If the injection timing is retarded, an after burning period is increased, whereby the exhaust gas temperature rises. The temperature of the filter 20 rises with the rise of the exhaust gas temperature.

A second exemplary method is to inject secondary fuel near the top dead center of an intake stroke in addition to the primary fuel. Hereinafter, such additional injection of the secondary fuel is referred to as VIGOM-injection. The VIGOM-injection increases the fuel injection amount. Therefore, the exhaust gas temperature rises, whereby the temperature of the filter 20 can be raised.

The VIGOM-injection near the top dead center of an intake stroke produces intermediate products such as aldehyde, ketone, peroxide and carbon monoxide by the compression heat during a compression stroke. These intermediate products accelerate reaction of the primary fuel that is injected subsequently. In this case, misfire will not occur even if the injection timing of the primary fuel is retarded, whereby excellent combustion is realized. The exhaust gas temperature can thus be raised by retarding the injection timing of the primary fuel. Therefore, the temperature of the filter 20 can be raised.

A third exemplary method is to conduct post-injection during an expansion stroke or an exhaust stroke in addition to injection of the primary fuel. In this case, most of the fuel injected by the post-injection is discharged to the exhaust pipe in the form of unburnt hydrocarbons (HC). The unburnt hydrocarbons (HC) are oxidized on the filter 20. The temperature of the filter 20 is raised by heat generated through the oxidation.

In step S107, it is determined whether the bed temperature of the filter 20 is at least 180° C. or not. If the bed temperature is 180° C. or higher, the routine proceeds to step S108.

On the other hand, if the bed temperature is less than 180° C., the routine returns to step S106, and the early warm-up combustion is continued while maintaining the engine speed of 1,200 rpm.

In step S108, it is determined whether the coolant temperature is at least 60° C. or not. If the coolant temperature is 60° C. or higher, the routine proceeds to step S109, and weak lean low-temperature combustion is conducted as a means for raising the temperature of the filter 20. The weak lean low-temperature combustion is conducted at the air-fuel ratio close to 18. However, the air-fuel ratio is not limited to 18 and may be in the range of 17 to 19. The low-temperature combustion is conducted at an air-fuel ratio that is lower than the air-fuel ratio in the normal combustion of the internal combustion engine 1. Since hydrocarbon (HC) components contained in the fuel bum on the filter 20, the bed temperature of the filter 20 rises.

Note that the air-fuel ratio can be adjusted to a desired value by varying the amount of EGR gas.

On the other hand, if the coolant temperature is less than 60° C., the routine proceeds to step S111, and post-injection is conducted as a means for raising the temperature of the filter 20.

These different means for raising the temperature of the filter 20 are thus used depending on the coolant temperature in order to stabilize combustion of the internal combustion engine 1. In other words, if the coolant temperature is 60° C. or higher, the low-temperature combustion is stable to raise the temperature of the filter 20. If the coolant temperature is less than 60° C., however, the low-temperature combustion becomes unstable. The reason why the low-temperature combustion is selected if the coolant temperature is 60° C. or higher is as follows: in the low load state, only a small amount of fuel is injected by the post-injection. In the case where such a small amount of fuel is injected in a plurality of times, it is difficult to control the injection amount. It is therefore preferable to conduct heat-up control by the low-temperature combustion.

It is thus preferable to conduct heat-up control by the low-temperature combustion because combustion stability is more likely to be obtained. If the coolant temperature is less than 60° C., however, post-injection is preferred to the low-temperature combustion in order to maintain an excellent combustion state.

Note that, it is desirable not to conduct the heat-up control of the filter 20 by the addition of fuel when the filter 20 is in a low bed-temperature range. This is in order to prevent the added fuel having a low temperature from adhering to the wall surface of the exhaust pipe. It is therefore preferable to employ the low-temperature combustion or the post-injection as a means for heat-up control that is conducted herein, because the low-temperature combustion and the post-injection do not cause such a problem.

After the low-temperature combustion is conducted in step S109, it is determined in step S110 whether the bed temperature of the filter 20 is at least 300° C. or not.

Even if the post-injection is conducted in step S111, it is determined in step S112 whether the bed temperature of the filter 20 is at least 300° C. or not.

If the bed temperature is less than 300° C. in step S110, the routine returns to step S109 and the weak lean low-temperature combustion is continued.

If the bed temperature is less than 300° C. in step S112, the routine returns to step S111 and the post-injection is continued.

If the bed temperature is 300° C. or higher in step S110, the routine proceeds to step S114, and the weak lean low-temperature combustion is continued at a further reduced air-fuel ratio than the air-fuel ratio in the low-temperature combustion. The weak lean low-temperature combustion of step S114 is conducted at an air-fuel ratio close to 16. However, the air-fuel ratio is not limited to 16 and may be in the range of 15 to 17.

If the bed temperature is 300° C. or higher in step S112, the routine proceeds to step S113, and it is determined whether the coolant temperature is at least 60° C. or not. If the coolant temperature is 60° C. or higher, the post-injection is discontinued. The routine then proceeds to step S114, and the weak lean low-temperature combustion is conducted.

If the bed temperature is less than 60° C. in step S113, the routine proceeds to step S115, and the fuel is added to the exhaust system for heat-up control.

After the low-temperature combustion of step S114 is conducted for a prescribed period, the routine proceeds to step S116, and it is determined whether the bed temperature of the filter 20 has reached at least 500° C. or not.

If the fuel is added in step S115, the routine proceeds to step S117 after a predetermined period, and it is determined whether the bed temperature of the filter 20 has reached at least 500° C. or not.

If the bed temperature of the filter 20 has not reached 500° C. in step S116, the routine returns to step S114, and the weak lean low-temperature combustion is further continued.

If the bed temperature of the filter 20 has not reached 500° C. in step S117, the routine returns to step S115, and the fuel is further added.

If the bed temperature of the filter 20 is 500° C. or higher in step S116, it is determined that PM recovery has been completed when the difference in pressure detected by the differential pressure sensor 37 has reduced to a predetermined value or less. If recovery from sulfur poisoning is not required, that is, if the sulfur poisoning recovery flag is OFF, the control is terminated.

Similarly, if the bed temperature of the filter 20 is 500° C. or higher in step S117, PM recovery is continued. It is determined that the PM recovery has been completed when the difference in pressure detected by the differential pressure sensor 37 has reduced to a predetermined value or less. If recovery from sulfur poisoning is not required, that is, if the sulfur poisoning recovery flag is OFF, the control is terminated.

On the other hand, if the sulfur poisoning recovery flag is ON, the routine proceeds to step S118, and the sulfur poisoning recovery control is executed. In this case, weak lean low-temperature combustion and addition of fuel are conducted in order to raise the temperature of the filter 20 to 600° C.

The routine then proceeds to step S119, and it is determined whether the bed temperature of the filter 20 is at least 600° C. or not. If the bed temperature is 600° C. or higher, the routine proceeds to step S122, and it is determined whether the sulfur poisoning recovery control has been conducted for a second predetermined period or more, e.g., three minutes or more. On the other hand, if the bed temperature is less than 600° C., the routine proceeds to step S120, and it is determined whether the air-fuel ratio is lower than the stoichiometric air-fuel ratio (theoretical air-fuel ratio) or not. If the air-fuel ratio is leaner than the stoichiometric air-fuel ratio, the routine returns to step S118, and heat-up control for recovery from sulfur poisoning is continued. On the other hand, if the air-fuel ratio is equal to or richer than the stoichiometric air-fuel ratio, the routine proceeds to step S121, and addition of fuel is discontinued for a prescribed period. In this state, it is estimated that oxygen does not exist in exhaust gas. Therefore, the fuel will not burn even if the fuel is further added. Accordingly, the routine returns to step S118 after a predetermined period that allows oxygen to exist in the exhaust gas. In step S118, the low-temperature combustion and addition of fuel are conducted in order to continue the heat-up control for recovery from sulfur poisoning.

If the sulfur poisoning recovery control has been conducted for the second predetermined period or more, that is, three minutes or more in total in step S122, it is determined that the catalyst has been recovered from sulfur poisoning, and the control is terminated.

If the sulfur poisoning recovery control has not been conducted for three minutes or more in total in step S122, this control is further continued. The control is terminated when it has been conducted for three minutes or more in total.

As has been described above, the exhaust gas purifying device for the internal combustion engine according to this embodiment operates as follows: removal of fine particles by oxidation or/and sulfur poisoning recovery control may be required in the state where the internal combustion engine remains in an idle state for a prescribed period, that is, the internal combustion engine remains in an extremely low load state for a predetermined period or more. In this case, the above exhaust gas purifying device first adjusts the engine speed of the internal combustion engine (1) to a range where the temperature of the filter (20) can be raised by the heat-up control. The exhaust gas purifying device then conducts the heat-up control by a filter temperature control means to raise the temperature of the filter (20) to a predetermined value. In order to raise the temperature of the filter, one or more appropriate methods out of low-temperature combustion, post-injection, addition of fuel to the exhaust system, and the like are conducted in combination depending on the state such as an operational state of the internal combustion engine, coolant temperature, and the like. When the filter (20) reaches the predetermined temperature, the exhaust gas purifying device conducts removal of fine particles by oxidation or/and sulfur poisoning recovery control for eliminating sulfur poisoning of a NOx absorbent The exhaust gas purifying device for the internal combustion engine according to the present invention is capable of carrying a NOx-purifying catalyst thereon and raising the temperature of the filter capable of capturing PMs to a predetermined temperature range even if the internal combustion engine remains in an extremely low load operational state. Therefore, removal of the PMs captured by the filter and sulfur poisoning recovery control of the NOx catalyst can be reliably conducted even in such a situation.

Removal of fine particles by oxidation or/and sulfur poisoning recovery control may be required when an internal combustion engine has been in an extremely low load state for a predetermined period or more. In this case, the engine speed of the internal combustion engine 1 is adjusted to a range where the temperature of a filter 20 can be raised by heat-up control. The heat-up control is then executed by a filter temperature control means to raise the temperature of the filter 20 to a predetermined value. When the filter 20 reaches the predetermined temperature by means of low-temperature combustion, post-injection, VIGOM-injection, addition of fuel to an exhaust system and the like, removal of fine particles by oxidation or/and sulfur poisoning recovery control for eliminating sulfur poisoning of a NOx absorbent are conducted. Removal of PMs captured by the filter and sulfur poisoning recovery control of the NOx absorbent can thus be conducted even if the internal combustion engine is left in an extremely low load operational state.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An exhaust gas purifying device for an internal combustion engine, comprising:

a filter carrying a NOx absorbent thereon and capable of temporarily capturing fine particles contained in an exhaust gas of the internal combustion engine and of removing the fine particles by oxidation in a prescribed temperature range, the NOx absorbent functioning to absorb NOx contained in the exhaust gas when the exhaust gas flowing into the NOx absorbent exhibits a lean air-fuel ratio and to discharge the absorbed NOx when the exhaust gas flowing into the NOx absorbent exhibits one of a theoretical air-fuel ratio and a rich air-fuel ratio; and a controller that:

executes heat-up control of the filter;

executes sulfur poisoning recovery for eliminating sulfur poisoning of the NOx absorbent, and adjusts an engine speed of the internal combustion engine to a range where a temperature of the filter can be raised by heat-up control (1) when it is determined that fine-particle removal by oxidation is to be executed or the sulfur poisoning recovery control is to be executed, (2) when it is determined that the temperature of the filter is below a predetermined temperature and (3) when it is determined that the internal combustion engine has been in an extremely low load state for a predetermined period or more, and then executes the heat-up control to raise the temperature of the filter to a predetermined value, thereby executing fine-particle removal by oxidation or executing the sulfur poisoning recovery control for eliminating sulfur poisoning of the NOx absorbent, wherein:

the heat-up control is executed by at least one of low-temperature combustion, post-injection, VIGOM-injection, and addition of fuel to an exhaust system according to an operational state of the internal combustion engine, the heat-up control for removing the fine particles by oxidation is executed by at least one of the low-temperature combustion, the post-injection, the VIGOM-injection, and the addition of fuel to the exhaust system, and the heat-up control for recovery from sulfur poisoning is executed by a combination of the low-temperature combustion and the addition of fuel to the exhaust system, and in the heat-up control for removing the fine particles by oxidation, at least the low-temperature combustion is conducted when a coolant temperature of the internal combustion engine is equal to or higher than a predetermined value, and at least the post-injection is conducted when the coolant temperature of the internal combustion engine is less than the predetermined value.

2. An exhaust gas purifying method of an exhaust gas purifying device for an internal combustion engine, including a filter carrying a NOx absorbent thereon and capable of temporarily capturing fine particles contained in an exhaust gas of the internal combustion engine and of removing the fine particles by oxidation in a prescribed temperature range, the NOx absorbent functioning to absorb NOx contained in the exhaust gas when the exhaust gas flowing into the NOx absorbent exhibits a lean air-fuel ratio and to discharge the absorbed NOx when the exhaust gas flowing into the NOx absorbent exhibits one of a theoretical air-fuel ratio and a rich air-fuel ratio, the method comprising the steps of:

adjusting an engine speed of the internal combustion engine to a range where a temperature of the filter can be raised by heat-up control, (1) when it is determined that fine-particle removal by oxidation is to be executed or sulfur poisoning recovery control is to be executed, (2) when it is determined that the temperature of the filter is below a predetermined temperature and (3) when it is determined that the internal combustion engine has been in an extremely low load state for a predetermined period or more;

executing the heat-up control to raise the temperature of the filter to a predetermined value; and executing fine-particle removal by oxidation or executing the sulfur poisoning recovery control for eliminating sulfur poisoning of the NOx absorbent, wherein:

the heat-up control is executed by at least one of low-temperature combustion, post-injection, VIGOM-injection, and addition of fuel to an exhaust system according to an operational state of the internal combustion engine, the heat-up control for removing the fine particles by oxidation is executed by at least one of the low-temperature combustion, the post-injection, the VIGOM-injection, and the addition of fuel to the exhaust system, and the heat-up control for recovery from sulfur poisoning is executed by a combination of the low-temperature combustion and the addition of fuel to the exhaust system, and in the heat-up control for removing the fine particles by oxidation, at least the low-temperature combustion is conducted when a coolant temperature of the internal combustion engine is equal to or higher than a predetermined value, and at least the post-injection is conducted when the coolant temperature of the internal combustion engine is less than the predetermined value.

* * * * *